United States Patent
Vo et al.

(10) Patent No.: US 7,429,330 B2
(45) Date of Patent: Sep. 30, 2008

(54) METHOD FOR REMOVING CONTAMINANTS FROM FLUID STREAMS

(75) Inventors: Toan Phan Vo, Niskayuna, NY (US); K. Raman Venkatesh, Wallingford, CT (US)

(73) Assignee: Calgon Carbon Corporation, Pittsburgh, PA (US)

( * ) Notice: Subject to any disclaimer, the term of this patent is extended or adjusted under 35 U.S.C. 154(b) by 410 days.

(21) Appl. No.: 11/014,892

(22) Filed: Dec. 16, 2004

(65) Prior Publication Data

US 2005/0155934 A1 Jul. 21, 2005

Related U.S. Application Data

(63) Continuation-in-part of application No. 11/006,084, filed on Dec. 7, 2004, and a continuation-in-part of application No. 11/005,825, filed on Dec. 7, 2004, and a continuation-in-part of application No. PCT/US03/39925, filed on Dec. 16, 2003, and a continuation-in-part of application No. 09/940,178, filed on Aug. 27, 2001, now Pat. No. 6,914,034.

(51) Int. Cl.
C02F 1/42 (2006.01)

(52) U.S. Cl. .................................... 210/667

(58) Field of Classification Search ................ 210/667, 210/222

See application file for complete search history.

(56) References Cited

U.S. PATENT DOCUMENTS

| | | | |
|---|---|---|---|
| 2,987,408 A | 6/1961 | Minick | |
| 4,201,831 A | 5/1980 | Slusarczuk et al. | |
| 4,284,511 A | 8/1981 | Weitzen et al. | |
| 4,319,893 A * | 3/1982 | Hatch et al. ................ | 95/27 |
| 4,532,115 A | 7/1985 | Nishino et al. | |
| 4,877,920 A | 10/1989 | Lush et al. | |
| 5,047,145 A | 9/1991 | Hwang | |
| 5,114,592 A | 5/1992 | Schuster et al. | |
| 5,158,580 A | 10/1992 | Chang | |
| 5,227,047 A | 7/1993 | Hwang | |
| 5,369,072 A | 11/1994 | Benjamin et al. | |
| 5,378,366 A | 1/1995 | Yen | |
| 5,432,077 A | 7/1995 | Farrah | |
| 5,556,545 A | 9/1996 | Volchek et al. | |
| 5,908,557 A | 6/1999 | Smith et al. | |
| 5,965,483 A | 10/1999 | Baker et al. | |
| 6,027,551 A | 2/2000 | Hwang et al. | |
| 6,030,537 A | 2/2000 | Shaniuk et al. | |
| 6,077,809 A | 6/2000 | Suzuki et al. | |
| 6,146,539 A * | 11/2000 | Mills ............................ | 210/712 |
| 6,383,981 B1 | 5/2002 | Blankenship et al. | |
| 6,475,386 B1 | 11/2002 | Carr et al. | |
| 6,540,088 B2 | 4/2003 | Oder | |
| 6,599,429 B1 | 7/2003 | Azizian | |
| 2002/0195407 A1 | 12/2002 | Levy | |
| 2003/0154865 A1 * | 8/2003 | Zornes ........................ | 96/143 |
| 2003/0196966 A1 | 10/2003 | Hughes | |
| 2004/0076557 A1 | 4/2004 | Altman | |
| 2004/0089608 A1 | 5/2004 | Vo | |
| 2004/0108275 A1 | 6/2004 | Shaniuk | |

FOREIGN PATENT DOCUMENTS

| | | |
|---|---|---|
| CA | 1067627 | 12/1979 |
| DE | 10152671 | 12/2002 |
| DE | 103 33 824 A1 | 7/2004 |
| DE | 20309296 | 9/2004 |
| EP | 0 719 584 A1 | 7/1996 |
| FR | 2839507 | 5/2002 |
| JP | 49 033896 A | 3/1974 |
| JP | 54089994 A * | 7/1979 |
| JP | 61 187931 A | 8/1987 |
| JP | 2001340873 | 12/2001 |
| RU | 2082496 | 6/1997 |
| WO | WO 2004026464 | 4/2004 |
| WO | WO 2004/064078 | 7/2004 |

OTHER PUBLICATIONS

Brian E. Reed, Ronald Vaughan, and Liquiang Jiang, As(III), As(V), Hg, and Pb Removal by Fe-Oxide Impregnated Activated Carbon, Journal of Environmental Engineering, Sep. 2000, vol. 126, No. 9, pp. 869-873.

B. Petrusevski, J. Boere, S.M. Shadhidullah, S.K. Sharma and J.C. Schippers, Adsorbent-based point-of-use system for arsenic removal in rural areas, Journal of Water Supply, Research & Technology-AQUA, 2002, pp. 135-144.

Ljubinka V. Rajakovic, The Sorption of Arsenic onto Activated Carbon Impregnated With Metallic Silver and Copper, Separation Science and Technology, vol. 27, No. 11, 1992, pp. 1423-1433.

Toxecon Retrofit for Mercury and Multi-Pollutant Control on Three 90 MW Coal-Fired Boilers, U.S. Department of Energy, Office of Fossil Energy, National Energy Technology Laboratory, Clean Coal power Initiative, Sep. 2004.

Orhan Ozdemir, Bahri Ersoy and Mehmet S. Celik, Separation of Pozzolonic Material from Lignitic Fly Ash of Tuncbilek Power Station, 2001 International Ash Utilization Symposium, Center for Applied Research, University of Kentucky, Paper #45.

Valuable products From Utility Fly Ash, Sep. 1, 1995 through Aug. 31, 1996, Final Technical Report, ICCI Project No. 95-1/3.1A-15, Principal Investigator Joseph A. DeBarr, ISGS, Other Investigators: David M. Rapp, Massoud Rostam-Abadi, Joseph M. Lytle, ISGS, Mark J. Rood, UIUC, Project Manager: Den Banerjee, ICCI.

(Continued)

*Primary Examiner*—Chester T. Barry
(74) *Attorney, Agent, or Firm*—Cohen & Grigsby, P.C.

(57) ABSTRACT

A method and recyclable magnetic adsorbent are provided for removing contaminants from a fluid stream that has by-products. The method includes providing an adsorbent material that has incorporated at least one ferromagnetic material. Contacting the ferromagnetic adsorbent material to at least a portion of contaminated stream to adsorb the contaminant. The contaminated adsorbent is then separated from the by-products using a magnetic separation process. The adsorbent is recovered from the solid by-products and reusable in the present method.

15 Claims, No Drawings

OTHER PUBLICATIONS

Database WPI/Derwent, XP-002327650, 2002.
Database WPI/Derwent, XP-002315607, 1975.
Database WPI/Derwent, XP-002315619, 1986.
Database WPI/Derwent, XP-002327536, 1998.
Bellack, E., *Arsenic Removal from Potable Water*, J. AWWA, vol. 65, pp. 454-458, 1971.
Hathaway, S.W. et al., *Removing Arsenic From Drinking Water*, J. AWWA, vol. 79, No. 8, pp. 61-65, 1987.
Diamadopoloulos, E. et al., *As(V) Removal from Aqueous Solutions by Fly Ash*, Wat. Res., vol. 27, No. 12, pp. 1773-1777, 1993.
Edwards, M., *Chemistry of Arsenic: Removal During Coagulation and Fe-Mn Oxidation*, Arsenic: The Quest for Answers, pp. 64-78, Sep. 1994.
Huang, C.P. et al., *Treatment of Arsenic(V)-containing Water by the Activated Carbon Process*, Journal WPCF, vol. 56, No. 3, pp. 233-242, Mar. 1984.
Huang, C.P., et al., *Enhancing $As^{5+}$ Removal by a $Fe^{2+}$-treated Activated Carbon*, Journal WPCF, vol. 61, No. 9, pp. 1596-1603, Sep. 1989.
Gupta, S.K. et al., *Arsenic Removal by Adsoprtion*, Journal WPCF, vol. 50, No. 3, pp. 493-505, Mar. 1978.
Epa Office of Water, *Arsenic in Drinking Water: Treatment Technologies: Removal*, Oct. 1995.
Abdel-Fattah, T.M. et al., *Screening of Low-Cost Adsorbents for Arsenic Removal*, Division of Environmental Chemistry, vol. 4 No. 1, pp. 422-425, Mar. 2000.
Arulanantham, A. et al., *Coconut Shell Carbon for Treatment of Cadmium and Lead-Containing Wastewater*, Metal Finishing, pp. 51-55, Nov. 1989.
Abdel-Shafy, H.I. et al., *Removal of Cadium and Lead from Water by Activated Carbon*, Environment Protection Engineering, vol. 15, Nos. 1-2, pp. 63-78, 1989.
Carriere, P. et al., *Effect of Influent Pb Concentration and Empty Bed Contact Time (EBCT) on Pb Removal by Granular Activated Carbon (GAC) Columns*, pp. 619-626.
Ferro-Garcia, M.A. et al., *Removal of Lead from Water by Activated Carbons*, Carbon, vol. 28, No. 4, pp. 545-552, 1990.
Gajghate, D.G. et al., *Kinetics of Adsorption of Lead by Active Carbon from Aqueous Solution*, Indian J. Environ. Hlth., vol. 32, No. 4, pp. 369-436, 1990.
Gajghate, D.G. et al., *Removal of Lead from Aqueous Solution by Active Carbon*, Indian J. Environ. Hlth., vol. 33, No. 3, pp. 374-379, 1991.
Raven, K.P. et al., *Arsenite and Arsenate Adsorption on Ferrihydrite: Kinetics, Eqilibrium, and Adsorption Envelopes*, Environmental Science & Technology, vol. 32, No. 3, pp. 344-349, 1998.
Singh, D.K. et al., *Removal of Toxic Metals Ions from Wastewater by Coal-Based Adsorbent*, Wat. Res. vol. 11 No. 1, pp. 37-42, 1992.
Twidwell, L.G. et al., *Technologies and Potential Technologies for Removing Arsenic from Process and Mine Wastewater*, REWAS, Global Symp. Recycl., Waste Treat. Clean Technol., pp. 1715-1726, 1999.
Cheng, J. et al., *Adsorption of Low Levels of Lead (II) by Granular Activated Carbon*, J. Environ. Sci. Health, A28 (1), pp. 51-71, 1993.
Daug, B. et al., *Sorption Materials for Arsenic Removal from Water: A Comparative Study*, Water Research, vol. 28, pp. 2948-2954, 2004.
Patoczka, J. et al., *Trace Heavy Metals Removal with Ferric Chloride*, Presented at Water Environment Federation Industrial Wastes Technical Conference, Nashville, TN, 1998.
Lorenzen, L. et al., *Factors Affecting the Mechanism of the Adsorption of Arsenic Species on Activated Carbon*, Minerals Engineering, vol. 8, Nos. 4-5, pp. 557-569, 1995.
Netzer, A. et al., *Adsorption of Copper, Lead and Cobalt by Activated Carbon*, Water Res., vol. 18, No. 8, pp. 927-933, 1984.
Kuenne, R.W. et al., *Removal of Lead in Drinking Water by a Point-of-Use Granular Activated Carbon Fixed Bed Adsorber*, Proc. Ann. Conf. Am. Waterworks Assoc., pp. 1451-1493, 1989.
Reed, B.E. et al., *Effect of pH, Empty Bed Contact Time and Hydraulic Loading Rate on Lead Removal by Granular Activated Carbon Columns*, Water Environment Research, vol. 68, No. 5, pp. 877-882, Jul./Aug. 1996.
Seco, A. et al., *Adsorption of Heavy Metals from Aqueous Solutions onto Activated Carbon in Single Cu and Ni Systems and in Binary Cu-Ni, Cu-Cd and Cu-Zn Systems*, J. Chem. Tech. Bbiotechol., vol. 68, pp. 23-30, 1997.
Nerac, Inc., *Arsenic Removal from Water by Adsorption*, Feb. 5, 2001 (abstract).
Jekel, M. et al., *Comparison of Conventional and New Techniques for the Removal of Arsenic in a Full Scale Water Treatment Plant*, Department of Water Quality Control, Technical Unversity of Berlin, Germany, 2000 (abstract).
Prasad, S.C. et al., *Arsenic (III) Removal by Sorption on Coconut Shell*, Department Civil Engineering, M N Regional Engineering College, Motihari, India, 1995 (abstract).
Tan, T.C. et al., *Combined Effect of Carbon Dosage and Initial Adsorbate Concentration on the Adsorption Isotherm of Heavy Metals on Activated Carbon*, Wat. Res. vol. 21, No. 10. pp. 1183-1188, 1987.
Uranowski, L.J. et al., *The Effect of Surface Metal Oxides on Activated Carbon Adsorption of Phenolics*, Wat. Res. vol. 32, No. 6, pp. 1841-1851, 1998.

\* cited by examiner

METHOD FOR REMOVING CONTAMINANTS FROM FLUID STREAMS

CROSS-REFERENCE TO RELATED APPLICATIONS

This application is a continuation-in-part of U.S. patent application Ser. No. 09/940,178 filed on Aug. 27, 2001, now U.S. Pat. No. 6,914,034; and is continuation-in-part of International Patent Application No. PCT/US03/39925 filed on Dec. 16, 2003. This application is also a continuation-in-part of U.S. patent application Ser. Nos. 11/006,084 and 11/005,825 both filed on Dec. 7, 2004.

FIELD OF INVENTION

The present invention relates to a method and material for removing contaminants, such as mercury, from a stream using a magnetic removable adsorbent material that may be recovered and reused.

BACKGROUND OF THE INVENTION

The Clean Air Act Amendments of 1990 required the EPA to study mercury emissions from combustion and other sources. The results from the coal-fired power plants showed that a certain level of mercury emission control was already achieved by the existing air pollution control devices (APCD). The extent of mercury removal at any given facility depended on a number of factors which included type of coal, fly ash composition, and type of APCD technology. The level of mercury control across the study ranged from 0% to more than 90%. The conclusion was that the existing APCD will not be able to achieve the future mercury emission limits.

One of the most promising solutions for mercury removal from flue gas is Activated Carbon Injection (ACI). Activated carbon is a highly porous, non-toxic, readily available material that has a high affinity for mercury vapor. This technology is already established for use with municipal incinerators. Although the ACI technology is effective for mercury removal, the short contact time between the activated carbon and the flue gas stream results in an inefficient use of the full adsorption capacity of the activated carbon. With coal-fired power plants, this process would also produce a fly ash by-product with an increased carbon content and an increased mercury content. Some of the power plants sell their fly ash by-product to the concrete industry. Fly ash with high carbon and mercury contents can become a waste product with no resale value. A fly ash by-product with high mercury content might also be classified as a hazardous waste and thereby increase disposal costs. Therefore there is a need for a modified ACI technology that is capable of separating the activated carbon from the fly ash. The separated activated carbon can be recycled and reused until it has been fully utilized. The separated fly ash will provide a low-carbon, low mercury fly ash product with maximum resale value or minimal disposal cost.

Mazyck (WO 2004/064078) discusses the use of magnetic powdered activated carbon (MPAC) for removing mercury from the flue gas of a coal-fired power plant or municipal waste incinerator using a powder injection technique. Partially spent MPAC is separated from the fly ash using a rotating magnetic drum separator and then the MPAC is recycled back into the process, but no data are presented as to the efficacy of this technology. The MPAC is an iron impregnated activated carbon that is produced by conventional means. A conventional iron impregnated activated carbon is prepared by first making the activated carbon itself. The activated carbon is loaded or impregnated with a water soluble iron salt, and then treated with KOH to produce a water-insoluble iron hydroxide on the carbon surface. The resulting product is then dried. Production of this carbon for mercury adsorption is expensive and thus impractical to use for removing contaminants from fluid streams.

Oder (U.S. Pat. No. 6,540,088) describes a separation device that uses both electrostatic and magnetic forces to separate particulate mixtures. In one experiment, the author describes the separation of activated carbon from an activated carbon/fly ash mixture, but does not the author describe the use of a magnet adsorbent material.

Chang (U.S. Pat. No. 5,158,580) teaches a two-stage process wherein a majority of fly ash is removed from a flue gas stream using an electrostatic precipitator. The flue gas is then treated using the activated carbon injection technique. The activated carbon and the last traces of the fly are then removed with a bag filter.

Altman (U.S. Ser. No. 2004/0076557) also teaches the treatment of the flue gas in two separate steps. In the first step, an electrostatic precipitator acts as the primary particulate collector. The resulting flue gas stream is then treated with powdered activated carbon. The second process step involves the collection of the activated carbon by a special two stage electrostatic precipitator. The application claims that this technology is cheaper than a second bag house.

Slusarczuk (U.S. Pat. No. 4,201,831) describes a magnetic adsorbent composite made from a mixture of organic material with a ferromagnetic material. The composite is subjected to an activation process. A powdered activated carbon with a reduced settling time is taught, but only for use in liquid systems, more specifically water purification.

Hwang (U.S. Pat. Nos. 6,027,551, 5,227,047, and 5,047,145) describe a froth floatation technology for the separation of unburned carbon from fly ash. The process does not describe the separation of activated carbon from fly ash.

Although technology for the removal of contaminants from a fluid stream using adsorbent materials already exists, there is a need for a simple, effective, and economical technology that allows for the separation of the adsorbent material from other process by-products. Particularly, such a technology is sought for use with by-products in dry processes such as, for example, fly ash and vapor contaminated streams in power plants. Separation of the absorbent material allows for the recycle and full utilization of the adsorbent material, thereby reducing the cost of operation.

SUMMARY OF THE INVENTION

The present invention provides a process for the removal of contaminants from a stream using a recoverable adsorbent material that is designed to overcome some of the shortcomings of the prior art. The process provides a simple more efficient means of removing contaminants by using an adsorbent material that may be reused after recovery to continue or repeat the contaminant removal process. Moreover, it does so without disrupting the contaminant producing process. The adsorbent material comprises a carbon adsorbent, silica, alumina, zeolite, zirconium oxide, or ion exchange resin, for example, that contains a ferromagnetic material. The preferred adsorbent material comprises an iron bearing activated carbon that is produced by adding iron oxide to a coal/pitch mixture during the first step of the process. The carbon is then activated to prepare an activated carbon according to existing activation processes, for example as shown in Example 1 below. This process produces a magnetic activated carbon (MAC), but at a lower cost than conventional impregnated carbon of the prior art such as discussed above. The MAC material is in various forms during the process. Initially, in one embodiment, it is a coal/pitch/iron oxide mixture which is later formed into briquette. Then MAC can also be formed into a granular or powder. The MAC can also be reduced to a powder having various particulate size ranges. Preferably, it is about a 325 mesh or smaller powdered MAC material to accommodate existing ACI technology.

The MPAC can be mixed with fly ash from various sources, such as a municipal waste incinerator. A belt magnetic separator is used in the experiments described below. Separation can be done by conventional separation devices including a belt magnetic separator. The results of the magnetic separation experiments show for example that 90% of the MPAC can be separated from the fly ash. This allows for recovery of the MPAC and also produces a high value fly ash product that has low carbon content and low mercury content.

When the recovered MPAC is only partially spent, it can continue to be used for additional removal of mercury, $SO_x$, $NO_x$, or any other contaminants that are suitable for chosen adsorbent material. Other features and advantages of the present invention will be apparent from perusal of the detailed description of the invention below.

DESCRIPTION OF THE INVENTION

In an embodiment of the present invention, the MPAC is made by: (1) pulverizing a carbonaceous material, a binder such coal or pitch, and at least one ferromagnetic material to form a powdered mixture; (2) compacting said powdered mixture into shaped objects; and (3) crushing and screening the shaped objects into a magnetic particulate material to produce MPAC.

In an example of step one, the carbonaceous material, binder and magnetic compound are pulverized together. Alternatively, the carbonaceous material, binder and magnetic compound are pulverized separately before making the pulverized mixture. In an example of step two, the compacting is accomplished by briquetting, pelletizing, densifying or extruding processes. The method may also have an additional step four that comprises gasifying the magnetic particulate material to produce carbon absorbent. In an embodiment, the gasifying of step four is conducted under an atmosphere comprising an oxygen-containing gas at a temperature in a range from about 900° C. to about 1100° C. for a time sufficient to produce a carbonaceous adsorbent material having a BET surface area of at least 10 $m^2/g$ and preferably the surface area is greater than about 100 $m^2/g$.

Suitable carbon materials for use in the present invention may be made from a variety of starting materials. Such materials include, but are not limited to, coals of various ranks such as anthracite, semianthracite, bituminous, subbituminous, brown coals, or lignites; nutshell, such as coconut shell; wood; vegetables such as rice hull or straw; residues or by-products from petroleum processing; and natural or synthetic polymeric materials. The carbonaceous material may be processed into carbon adsorbents by any conventional thermal or chemical method known in the art. The adsorbents will inherently impart different surface areas and pore volumes. Generally, for example, lignites can result in carbon having surface areas about 500-600 $m^2/g$ and, typically, fiber-based carbons areas are about 1200-1400 $m^2/g$. Certain wood-based carbons may have areas in the range of about 200 $m^2/g$, but tend to have a very large pore volume. Surface area and pore volume of coal based carbon may also be made to allow for some control of surface area and pore volumes.

In an example the adsorbent is a porous carbon adsorbent that has a large surface area as measured by the Brunauer-Emmett-Teller ("BET") method, and has a substantial micropore volume. As used herein, "micropore volume" is the total volume of pores having diameter less than about 2 nm. Suitable carbon adsorbents for use in the present invention are those having a BET surface areas greater than about 10 $m^2/g$ or about 50 $m^2/g$, preferably greater than about 200 $m^2/g$, and more preferably greater than about 400 $m^2/g$. In an example, the adsorbent has a micropore volume of greater than about 5 $cm^3/100$ g. In another example, the adsorbent has a micropore volume greater than about 20 $cm^3/100$ g.

Magnetic materials include any ferromagnetic materials, for example, iron or compounds or alloys that contain iron, cobalt, or nickel. Some rare earths such as gadolinium and dysprosium are also considered ferromagnetic materials and are contemplated to work in the present invention. In a preferred example, iron is used because it is strongly magnetic, relatively inexpensive, and readily available in large quantities. In an embodiment, the carbon adsorbent contains a magnetic material at a concentration of up to about 50% by weight of the carbon. Preferably, the magnetic material is present at a concentration in the range from about 1% to about 40% or, more preferably, from about 2% to about 30% and, more preferably, from about 3% to about 20% by weight of the carbon.

The MAC can also be converted to any known functional activated carbon using the known techniques without interference from the magnetic additive. The result is the same functional activated carbon except that it can be handled or separated using magnetic techniques. Activated carbons that are impregnated with metal oxides, metal salts, ammonia, halogens or halogen compounds, elements such sulfur, metals such as silver, or metal catalysts are just a few examples. The surface of the MAC can also be chemically modified to generate, for example, carboxylic acid groups or to attach sulfonic acid groups. The activated carbon can also be a carrier for functional organic compounds, functional polymers such as ion exchangers, enzymes, and chelaters such as EDTA for example. The MAC can also be compounded with other materials to impart both adsorption and magnetic properties to the final product.

The present invention provides a process for the removal of contaminant or contaminants from a fluid stream. The contaminants can be the result of a process having solid and gaseous by-products. In an example the fluid stream is a gaseous stream such as contaminated vapors, an exhaust stream or emissions from a coal-fired power plant. For example, the by-products can include combustion product, fly ash, or particulate matter among others. In another example, the stream is a liquid stream, such as contaminated water that may or may not be contaminated as a result of a process.

In the method, a magnetic adsorbent such as that described above, contacts at least a portion of the stream. In an embodiment, the adsorbent is selected from the group of adsorbents consisting of a porous carbonaceous adsorbent, silica, alumina, zeolite, zirconium oxide, ion exchange resins, or combinations thereof, and has incorporated therein at least one ferromagnetic material. The magnetic adsorbent adsorbs the contaminant from the stream. Subsequently the contaminated magnetic adsorbent is separated from the non-magnetic by-product using a conventional magnetic separation process, such as a belt magnetic separation process. Then the contaminated magnetic adsorbent can be separated from the other by-products or the stream or both, as appropriate for the application.

In another example, the adsorbent, by-products and other particulate matter are separated from the fluid stream using a conventional separation means, such as a particulate collection device. Thereafter, the magnetic adsorbent is separated from the non-magnetic materials including the by-products. The recovered contaminated magnetic adsorbent can be reused in the process until its capacity to adsorb such contaminants is reached or the efficiency is such that it is no longer desirable and/or effective in the process. Optionally, unused magnetic adsorbent can be combined with contaminated magnetic adsorbent for continued use in the process until capacity of one or both achieve capacity.

In another example the fluid stream is configured such that magnetic adsorbent is streamed separately from the stream containing non-magnetic materials. Thereafter the contaminated magnetic adsorbent can be separated from the fluid stream.

The following examples illustrate several embodiments of the present invention, but are not intended to be limiting.

EXAMPLE 1

Meadow River bituminous coal (a bituminous coal from West Virginia, U.S.A.) was pulverized with 4% (by weight of the coal) coal tar pitch and 7% (by weight of the coal) $Fe_3O_4$ powder so that at least 90% of the pulverized material passed through 325 mesh screen (U.S. sieve series). Alternatively, the coal, pitch binder, and the iron powder may be pulverized separately and then mixed together after pulverization. The powder mixture was compacted in a Fitzpatrick roll press at about 1.5 MPa into elongated briquettes of about 1 cm wide, about 0.5 cm thick, and about 3-4 cm long. Other briquette shapes and sizes also may be used. The mixture also may be extruded into pellets instead of the above pressing to briquettes. The compaction pressure may be appropriately chosen for the particular coal used. It may be higher or lower than the pressure disclosed above, but typically is in the range from about 8 MPa to about 16 MPa.

The briquettes were crushed and screened to produce particles having a mesh size of about 6×14. The produced particles were oxidized under an excess flow of air in an indirectly heated rotary kiln, the temperature of which was increased from ambient to about 250° C. at a rate of 45° C. per hour, and then from 250° C. to about 450° C. at a rate of 60° C. per hour. Other oxidizing gases also may be used, such as a mixture of oxygen and air or an inert gas, which mixture has an oxygen concentration greater than about 21% by volume, or a combustion product from a combustor containing oxygen, steam, and other gases. The resulting oxidized iron-containing coal particulate material was gasified in steam at 925-950° C. for about 40-45 minutes to produce an iron-containing porous carbon adsorbent of the present invention.

The step of gasifying the carbon precursor, such as this coal particulate, in an oxidizing atmosphere is usually termed "activation." It should be understood that the activation temperature and time are chosen to be appropriate for the type of coal, the compaction technique, the type of activation furnace used in the process of manufacture, and the desired microporosity of the activated product. Generally, higher-rank coals and higher compaction would require a higher temperature and/or a longer time. A longer activation time produces a more porous activated carbon. Activation furnace types that provide a very intimate contact between the solid and the gas phase and a well-mixed solid therein usually require a shorter activation time. Activation temperature is typically in the range from about 900° C. to about 1100° C., and activation time is typically in the range from about 10 minutes to about 10 hours.

In addition to steam, other oxygen-containing gases may also be present. The steps of oxidizing the coal particles and of gasifying the oxidized coal particles were carried out in this example in a rotary kiln. However, other types of furnaces or kilns may also be used in which an intimate contact between the solid and the gas phase can be maintained. Suitable furnaces or kilns are fluidized-bed kilns, belt furnaces, and Herreshoff furnaces. A representative sample of this adsorbent was pulverized in titanium vials using tungsten balls as disclosed above for testing.

EXAMPLE 2

In an example, the adsorbent is an iron bearing activated carbon that is magnetic. The adsorbent is magnetic enough to be removed with an existing belt magnetic separator. It has been discovered that such magnetic activated carbon can be separated from fly ash using a dry magnetic separation process. MPAC containing 7 wt % of iron oxide, prepared according to the method of Example 1, was mixed to a level of 1.0 wt % with fly ash from a municipal waste incinerator (MWI). The magnetic susceptibilities (MS) are shown in Table 1.

TABLE 1

| Material | Magnetic Susceptibility (μcc/gm) |
| --- | --- |
| Magnetic PAC | 1300 |
| Non-Magnetic PAC | 39.0 |
| MWI Fly Ash | 100.0 |
| 1.0 Wt. % Magnetic PAC in Fly Ash | 120.0 |

This MPAC has a MS that is strong enough that it can be removed with a magnetic separation process. The normal non-magnetic PAC has a much lower MS. The fly ash itself also contains a portion of magnetic materials. A dry magnetic separation process was used to separate the MPAC from the fly ash. The magnetic separator was a belt separator that used neodymium-iron-boron permanent magnets. The sample was fed at a rate of 9 pounds per minute using a vibrating feeder. The permroll paper belt was run at a rate of 400 rpm.

The results of the separation of 1.0 wt % MPAC from the fly ash mixture are shown in Table 2.

TABLE 2

| Fractions | Weight Recovery (%) |
| --- | --- |
| "Magnetic" | 6.32 |
| "Non-Magnetic" | 93.68 |

A Germanium oxide tracer was incorporated into the MPAC so that the MPAC recovery could be determined with accuracy. Germanium has a very high response in plasma emission or atomic absorption spectroscopy. The fly ash did not contain any Germanium. The overall separation efficiency of the 1.0 wt % MPAC from the fly ash mixture is shown in Table 3.

TABLE 3

| Estimated MPAC Recovery in Magnetic Fraction | Calculated MPAC Recovery from Germanium Tracer Balance |
|---|---|
| 15.8% | 14.23% |

The estimated recovery from the magnetic fractions is 1.0 wt % MPAC in a total collected magnetic fraction of 6.32 wt %. Therefore, the percentage of MPAC in the magnetic fraction is 15.8%. The recovery based on the Germanium tracer is 14.23%. This shows a 90% recovery of the original PAC. The purity of the recovered MPAC is 14.23%

A simulated "low magnetics" fly ash was prepared by first performing the magnetic separation on just the fly ash. The "non-magnetic" fly ash was then mixed with 1.0 wt % MPAC and subjected to the magnetic separation process. The recovered magnetic fraction was 3.33 wt %, or a MPAC purity of 30%. Investigations to further improve the purity of the recovered MPAC are currently underway.

It has been demonstrated that the invention provides a method for producing a less expensive, more efficient MAC for contaminant removal from fluid streams. In the case of coal-fired power plants, the MAC can be used for mercury removal from the flue gas stream. The MAC is added to the flue gas before the fly ash is removed allowing greater contact time between the MAC and the flue gas stream. Surprisingly, the MAC was effectively recovered from the fly ash by-product using the magnetic separation process. As a result, MAC by-product was recovered and could then be re-used or recycled back into the flue gas stream. Additionally, the authors also discovered the described process produces a high value fly ash by-product that has a low carbon content and a low mercury content. When the adsorption capacity of the MAC has been fully utilized, it is replaced with fresh material and the process is continued.

EXAMPLE 3

In another example, the method of the instant invention employs an adsorbent of activated carbon with at least one oxygen-containing compound of at least one ferromagnetic metal incorporated therein. In addition to being separable from the contaminants using a magnetic separation process, the adsorbent is capable of interacting with contaminants to lower a concentration of the contaminant in the stream. For example, the adsorbent interacts with the contaminant by adsorption, such as by interacting with the anions or cations of the contaminant, chemisorption, ion exchange, reaction or a combination thereby lowering a concentration of contaminant in the stream. Thus, it can also be used in an aqueous system for ion exchange. For instance, the ferromagnetic metal is iron such as the iron bearing activated carbon of Example 1. One example is the removal of arsenic from a water solution. An arsenic solution was prepared with a target concentration of 1,000 ppb (1 ppm). The results of the testing are shown in Table 4.

TABLE 4

| Bottle Number | Amount of Carbon Adsorbent (g) | Residual As Concentration (ppb) | pH (measured with pH meter) |
|---|---|---|---|
| 3246-18G | 0 | 837 | 5.9 |
| 3246-18I | 0.5 | 685 | 6.4 |
| 3246-18K | 2.5 | 20 | No data |
| 3246-18L | 5.0 | 21.7 | No data |

This carbon has not only ion exchange functionality but can also be handled or separated using magnetic techniques. Wet magnetic separation processes have been known for many years. The most prominent example is the use in gold recovery processes (U.S. Pat. No. 4,284,511).

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A method for removing contaminant from a fluid stream resulting from a process having solid and gaseous by-products, said method comprising the steps of:
   a. contacting at least a portion of said stream with a magnetic adsorbent wherein said adsorbent is selected from the group of adsorbents consisting of a porous carbonaceous adsorbent, silica, alumina, zeolite, zirconium oxide, ion exchange resins, or combinations thereof, and has incorporated therein at least one ferromagnetic material wherein said magnetic adsorbent adsorbs the contaminants; and
   b. separating said contaminated magnetic adsorbent from said by-products using a magnetic separation process and recovering any contaminated magnetic adsorbent from the other by-products, wherein said by-product is combustion product or fly ash from a coal burning power plant.

2. The method of claim 1, wherein said contaminant is mercury, $SO_x$, $NO_x$, any other material capable of being adsorbed by said adsorbent, or any combinations thereof.

3. The method of claim 1, wherein said adsorbent is activated carbon.

4. The method of claim 1 wherein said adsorbent has a BET surface area greater than about 10 $m^2/g$ and has incorporated therein at least one oxygen-containing compound of at least one ferromagnetic metal, wherein said adsorbent is capable of interacting with said contaminant to lower a concentration of said contaminant in said stream.

5. The method claim 4, wherein said adsorbent interacts with said contaminant by adsorption, chemisorption, ion exchange, reaction or a combination thereof to lower a concentration of said contaminant in said stream.

6. The method according to claim 1, wherein said ferromagnetic material is a ferromagnetic compound or alloy containing iron, cobalt, nickel, gadolinium, dysprosium or mixtures thereof.

7. The method of claim 1, wherein said magnetic adsorbent is an iron bearing powdered activated carbon.

8. The method of claim 1, wherein the magnetic adsorbent is further treated to create a functionalized magnetic adsorbent by means of impregnation, chemical modification, or attachment of functional groups or polymers, or the like.

9. The method of claim 1 wherein the magnetic separation process is a belt magnetic separation process.

10. The method of claim 1 wherein said stream contains particulate matter.

11. The method of claim 1 wherein said recovered contaminated magnetic adsorbent is reused in said method.

12. A method for removing contaminant from a stream, said method comprising the steps of:
   a. contacting at least a portion of said stream with an adsorbent wherein said adsorbent is selected from the group consisting of a porous carbonaceous adsorbent, silica, alumina, zeolite, zirconium oxide, ion exchange resins, or combinations thereof; said adsorbent has a BET surface area greater than about 10 $m^2/g$; and said adsorbent has incorporated therein at least one ferromagnetic material and at least one oxygen-containing compound of at least one ferromagnetic metal; and
   b. separating said adsorbent from said stream using a magnetic separation process.

13. The method of claim 12, wherein said stream contains combustion product or fly ash from a coal burning power plant.

14. The method of claim 12 wherein said wherein said adsorbent interacts with said contaminant by adsorption, chemisorption, ion exchange, reaction or a combination thereof to lower a concentration of said contaminant in said stream.

15. A method for removing contaminant from a fluid stream resulting from a process having solid and gaseous by-products, said method comprising the steps of:
   a. contacting at least a portion of said stream with a magnetic adsorbent wherein said adsorbent is selected from the group of adsorbents consisting of a porous carbonaceous adsorbent, silica, alumina, zeolite, zirconium oxide, ion exchange resins, or combinations thereof and has incorporated therein at least one ferromagnetic material wherein said magnetic adsorbent adsorbs the contaminants, and said adsorbent is further treated to create a functionalized magnetic adsorbent by means of impregnation, chemical modification, or attachment of functional groups or polymers, or the like; and
   b. separating said contaminated magnetic adsorbent from said by-products using a magnetic separation process and recovering any contaminated magnetic adsorbent from the other by-products.

* * * * *

UNITED STATES PATENT AND TRADEMARK OFFICE
CERTIFICATE OF CORRECTION

PATENT NO. : 7,429,330 B2 Page 1 of 1
APPLICATION NO. : 11/014892
DATED : September 30, 2008
INVENTOR(S) : Toan Phan Vo and K. Raman Venkatesch It is certified that error appears in the above-identified patent and that said Letters Patent is hereby corrected as shown below:

Title Page, item (63) and column 1, line 10, "PCT/US03/39925" should read "PCT/US2003/039925"

Signed and Sealed this

Second Day of June, 2009

JOHN DOLL
*Acting Director of the United States Patent and Trademark Office*